(12) United States Patent
Cho

(10) Patent No.: US 12,117,341 B1
(45) Date of Patent: Oct. 15, 2024

(54) SPECTROMETER

(71) Applicant: ANSWERAY INC., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 0 days.

(21) Appl. No.: 18/523,463

(22) Filed: Nov. 29, 2023

(30) Foreign Application Priority Data

Jun. 26, 2023 (KR) ........................ 10-2023-0081575

(51) Int. Cl.
*G01J 3/04* (2006.01)
*G01J 3/02* (2006.01)
*G01J 3/18* (2006.01)
*G01J 3/28* (2006.01)

(52) U.S. Cl.
CPC ........... *G01J 3/1804* (2013.01); *G01J 3/0208* (2013.01); *G01J 3/04* (2013.01); *G01J 3/2823* (2013.01)

(58) Field of Classification Search
CPC .......... G01J 3/04; G01J 3/2823; G01J 3/1804; G01J 3/0208
See application file for complete search history.

(56) References Cited

U.S. PATENT DOCUMENTS

| | | | | |
|---|---|---|---|---|
| 5,391,865 | A * | 2/1995 | Kurata | G11B 7/1381 369/44.37 |
| 2012/0281238 | A1* | 11/2012 | Hermann | G01D 5/34715 356/498 |

FOREIGN PATENT DOCUMENTS

| | | |
|---|---|---|
| JP | 2023-085132 A | 6/2023 |
| KR | 10-2020-0004576 A | 1/2020 |
| KR | 10-2114161 B1 | 5/2020 |
| KR | 10-2021-0032663 A | 3/2021 |

OTHER PUBLICATIONS

Korean Notice of Allowance for related KR Application No. 10-2023-0081575 mailed Feb. 7, 2024 from Korean Intellectual Property Office.
Korean Office Action for related KR Application No. 10-2023-0081575 mailed Nov. 13, 2023 from Korean Intellectual Property Office.

* cited by examiner

*Primary Examiner* — Maurice C Smith
(74) *Attorney, Agent, or Firm* — Paratus Law Group, PLLC

(57) ABSTRACT

Disclosed is a spectrometer including a slit unit and a collimating member sequentially arranged along a path of pre-diffraction radiation light, a focusing member and a detection unit sequentially arranged along a path of post-diffraction radiation light, and the diffraction grating located between the collimating member and the focusing member, wherein the slit unit, the collimating member, the diffraction grating, and the focusing member are seated in one plane and are spaced apart from each other by a predetermined distance, and the detection unit is spaced apart from one plane and is located under or above the diffraction grating.

14 Claims, 13 Drawing Sheets

108a (@ 36)

108b (@ 36)

SPECTROMETER

CROSS-REFERENCE TO RELATED APPLICATION

This application claims the benefit of priority to Korean Patent Application No. 10-2023-0081575 filed on Jun. 26, 2023, the disclosure of which is incorporated herein by reference in its entirety.

BACKGROUND OF THE INVENTION

1. Field of the Invention

The present invention relates to a spectrometer that allows pre-diffraction radiation light generated from a test sample by reflection, absorption, scattering, etc. in front of a diffraction grating for spectroscopic purposes to be transmitted or reflected through the diffraction grating to generate post-diffraction radiation light at the rear of the diffraction grating and analyzes the test sample through the post-diffraction radiation light.

2. Description of the Related Art

In general, a spectroscopy apparatus is an apparatus configured to identify a material based on spectroscopy, which analyzes the interaction between light and the material according to wavelength ($\lambda$) or frequency ($\nu$) or energy (E). The interaction between light and the material is performed through an absorption process and an emission process.

The absorption process is a process of irradiating the substance with electromagnetic radiation and allowing the electromagnetic radiation to be partially absorbed into the material, thereby decreasing energy of the electromagnetic radiation that reaches a detector. The emission process is a process of irradiating the material with electromagnetic radiation and allowing the electromagnetic radiation to be emitted from the material, thereby increasing energy of the electromagnetic radiation that reaches the detector.

Here, the absorption process and the emission process entail transition to different energy levels or states related to electrons, vibration, or rotation at an atomic level or a molecular level of the material. That is, the transition is caused by incident photons corresponding to the energy difference between the ground state and the excited state of the material.

The transition entails change in electronic energy, vibrational energy, or rotational energy at the atomic level or the molecular level of the material. Consequently, the detector receives a spectrum of electromagnetic radiation through transition occurring in the material during irradiation of the material with the electromagnetic radiation. As a result, the spectroscopy apparatus qualitatively analyzes or quantitatively analyzes the material based on the spectrum received in the detector such that a user can identify the type of the material.

In order to implement spectroscopy, a conventional spectroscopy apparatus 54 or 58 of FIG. 1 or 2 includes an optical slit unit 10, a convex lens 14, a diffraction grating 18, a light concentration member 24 or 28, and a detector 40 sequentially arranged in one plane (e.g. an X-Y plane).

During operation of the spectroscopy apparatus 54 or 58, the spectroscopy apparatus 54 or 58 has pre-diffraction radiation light L1 or L3 between the optical slit unit 10, the convex lens 14, and the diffraction grating 18 and post-diffraction radiation light L2 or L4 between the diffraction grating 18, the light concentration member 24 or 28 and the detector 40. The pre-diffraction radiation light L1 or L3 is light that is generated in a material to be analyzed before capture by the optical slit unit 10 and is captured by the optical slit unit 10, although not shown in the figures.

Meanwhile, the pre-diffraction radiation light L1 or L3 is radiated from the optical slit unit 10 to the convex lens 14, and is then transmitted from the convex lens 14 toward the diffraction grating 18 in parallel. Subsequently, the pre-diffraction radiation light L1 or L3 is diffracted into multiple wavelengths through the diffraction grating 14, whereby post-diffraction radiation light L2 or L4 is formed. In addition, the post-diffraction radiation light L2 or L4 is transmitted from the diffraction grating 14 to the light concentration member 24 or 28, is then focused on a photoelectric device of the detector 40, such as a photodiode array, a charge coupled device (CCD), or an image sensor 36, through the light concentration member 24 or 28, as shown in FIGS. 1 and 3 or as shown in FIGS. 2 and 3.

At this time, the diffraction grating 14 and the detector 40 are located along a first optical axis (see reference symbol P1 in FIG. 4, 5, 6, or 9) passing through the center of the light concentration member 24 or deviating from a second optical axis (see reference symbol P2 in FIG. 7 or 8) passing through the center of the light concentration member 28 and the front of the light concentration member 24 or 28. Consequently, the post-diffraction radiation L2 or L4 is subject to spherical aberration through the shape of the light concentration member 24 or 28 even though the post-diffraction radiation light L2 or L4 is parallel to the first optical axis P1, or is subject to coma aberration and astigmatism through the diagonal arrangement of the diffraction grating 14, the light concentration member 24 or 28, and the detector 40 based on the second optical axis P2.

Although not mentioned above, the light concentration member 24 is a convex lens. When the post-diffracted radiation light L2 (see, for example, reference numeral 62 in FIG. 4) is transmitted through the convex lens, therefore, the post-diffracted radiation light is divided by wavelength, as shown in FIG. 4, whereby chromatic aberration is caused, similarly to a prism. That is, the post-diffraction radiation light 63 is divided by color, for example, from a wavelength of red to a wavelength of violet, through the light concentration member 24, and thus has different focuses by color on the first optical axis P1 between the light concentration member 24 and the detector 40.

For example, the red colored light 66 is focused on the photoelectric device 36, whereas the blue colored light 69 is focused between the light concentration member 24 and the photoelectric device 36. Consequently, the post-diffraction radiation light 63 blurs the shape of an object spot on the photoelectric device 36 through chromatic aberration of the light concentration member 24. In contrast, the post-diffraction radiation light L4 causes no chromatic aberration because the post-diffraction radiation light L4 is reflected from the light concentration member 28 without passing through the concave mirror. In addition, the light concentration member 24 or 28 causes spherical aberration upon receiving the post-diffracted radiation light L2 or L4 (see, for example, reference numeral 74 in FIG. 5 or reference numeral 78 in FIG. 7) parallel to the first or second optical axis P1 or P2.

That is, the post-diffraction radiation light 74 or 78 has a focus on the photoelectric device 36 for paraxial light and a focus between the light concentration member 24 or 28 and the photoelectric device 36 for far-axis light depending on the position at which the post-diffraction radiation light 74 or 78 passes through or is reflected from the light concentration member 24 or 28 from the first or second optical axis P1 or P2. Consequently, the post-diffraction radiation light 74 or 78 blurs the shape of an object spot on the photoelectric device 36 through spherical aberration of the light concentration member 24 or 28. For example, the post-diffraction radiation light 74 or 78 generates a wave pattern in the vicinity of an image of an object point as shown in FIG. 15 on the photoelectric device 36 through spherical aberration of the light concentration member 24 or 28.

Spherical aberration of the light concentration member 24 or 28 is caused by different curvatures on an outer circumferential surface of the light concentration member 24 or 28. In addition, the light concentration member 24 or 28 causes coma aberration upon receiving the post-diffraction radiation light L2 or L4 (see, for example, reference numeral 82 in FIG. 6 or reference numerals 84, 86, and 88 in FIG. 8) at an angle in a state of being spaced apart from the first or second optical axis P1 or P2. That is, the post-diffraction radiation light 82 has a focus on the photoelectric device 36 for paraxial light and has no focus on the photoelectric device 36 for far-axis light depending on the position at which the post-diffraction radiation light 82 passes through the light concentration member 24 from the first optical axis P.

Similarly, when viewed depending on the position at which the post-diffraction radiation light 84, 86, and 88 is reflected by the light concentration member 28 from the second optical axis P2, the post-diffraction radiation light 84, 86, and 88 has a focus of an object point on the photoelectric device 3 when transmitted to the light concentration member 28 in parallel to the second optical axis P2 as parallel light 84. When the post-diffraction radiation light 84, 86, and 88 is transmitted to the light concentration member 28 at an angle to the second optical axis P2 as diagonal light 86 and 88, however, the light concentration member 28 reflects the object point in a stretched shape, and the post-diffraction radiation light has no focus of the object point on the photoelectric device 36. Consequently, the post-diffraction radiation light 82 or 84, 86, and 88 blurs the shape of an object point on the photoelectric device 36 through coma aberration of the light concentration member 24 or 28.

For example, the post-diffraction radiation light 82 or 84, 86, and 88 generates a comet tail in the vicinity of an image of an object point as shown in FIGS. 6 and 16 on the photoelectric device 36 through coma aberration of the light concentration member 24 or 28. Coma aberration of the light concentration member 24 or 28 is caused since the light concentration member 24 or 28 has different refractive indices in one direction. In addition, the light concentration member 24 causes astigmatism upon receiving the post-diffraction radiation light L2 (see, for example, reference numerals 94 and 98 in FIG. 9) at an angle in a state of being spaced apart from the first optical axis P1.

That is, the post-diffraction radiation light L2 has a first focus 36S1 in front of the photoelectric device 36 when being traced as meridional plane transmitted light 94 with respect to the first optical axis P1 in the light concentration member 24, and has a second focus 36S2 at the rear of the photoelectric device 36 when being traced as spherical plane transmitted light 98 with respect to the first optical axis P1 in the light concentration member 24. Here, the post-diffraction radiation light 94 represents an object point at the first focus 36S1 as a horizontally elongated oval shape, represents the object point at the photoelectric device 36 as a circle shape, and represents the object point at the second focus 36S2 as a vertically elongated oval shape.

Similarly, although not shown in the figures, the light concentration member 28 may also cause astigmatism upon receiving the post-diffraction radiation light L4 at an angle with respect to the second optical axis P2, in the same manner as the light concentration member 24. Consequently, the post-diffraction radiation light L2 or L4 blurs the shape of an object spot on the photoelectric device 36 through astigmatism of the light concentration member 24 or 28. For example, the post-diffraction radiation light 94 and 98 generates a smudge pattern in the vicinity of an image of an object point as shown in FIG. 17 on the photoelectric device 36 through astigmatism of the light concentration member 24 or 28.

In conclusion, the post-diffraction radiation light L2 or L4 causes spherical aberration, coma aberration, and astigmatism of the light concentration member 24 or 28 is thus received in the photoelectric device 36 at a size larger than the opening area of the optical slit unit 10. That is, the photoelectric device 36 must receive only normal colored light 104 of a specific wavelength corresponding to the opening area of the optical slit unit 10 in one of the plurality of pixels 33, but receives extended colored light 108 of the same specific wavelength in, for example, two pixels 33 adjacent to the one pixel 33 together with the one pixel 33 through spherical aberration, coma aberration, and astigmatism of the light concentration member 24 or 28.

As a result, the extended colored light 108 degrades the color-specific resolution of the photoelectric device 36 and has lower energy intensity than the normal colored light 104, making it difficult to analyze a material to be analyzed.

SUMMARY OF THE INVENTION

The present invention has been made in view of the above problems, and it is an object of the present invention to provide a spectrometer configured such that, when pre-diffraction radiation light is transmitted or reflected through a diffraction grating to generate post-diffraction radiation light and the post-diffraction radiation light is sequentially transmitted from a focusing member to a detection unit, it is possible to maximize the intensity of the post-diffraction radiation light received in a photoelectric device of the detection unit while minimizing aberration of the focusing member by adjusting the arrangement of the diffraction grating, the focusing member, and the detection unit.

In accordance with the present invention, the above and other objects can be accomplished by the provision of a spectrometer configured to generate pre-diffraction radiation light generated from a test sample in front of a diffraction grating, to allow the pre-diffraction radiation light to be transmitted through the diffraction grating, to generate post-diffraction radiation light at the rear of the diffraction grating, and to analyze the test sample through the post-diffraction radiation light, the spectrometer including a slit unit and a collimating member sequentially arranged along a path of the pre-diffraction radiation light, a focusing member and a detection unit sequentially arranged along a path of the post-diffraction radiation light, and the diffraction grating located between the collimating member and the focusing member, wherein the slit unit, the collimating member, the diffraction grating, and the focusing member are seated in one plane and are spaced apart from each other by a predetermined distance, and the detection unit is spaced apart from the one plane and is located under or above the diffraction grating.

The slit unit and the diffraction grating may be spaced apart from the collimating member by the same focal length.

The collimating member may be a convex lens or may include a concave mirror.

The diffraction grating and the detection unit may be spaced apart from the focusing member by the same focal length.

The focusing member may include a concave mirror configured to be open toward the diffraction grating and the detection unit.

When neighboring two of the slit unit, the collimating member, and the diffraction grating have a first focal length and neighboring two of the diffraction grating, the focusing member, and the detection unit have a second focal length, the first focal length may be equal to the second focal length.

When neighboring two of the slit unit, the collimating member, and the diffraction grating have a first focal length and neighboring two of the diffraction grating, the focusing member, and the detection unit have a second focal length, the first focal length may be different from the second focal length.

When the collimating member is a convex lens, the pre-diffraction radiation light may have a straight path along the arrangement of the slit unit, the collimating member, and the diffraction grating, and the post-diffraction radiation light may form an acute angle between pre-contact and post-contact paths to the focusing member when viewed along the arrangement of the diffraction grating, the focusing member, and the detection unit.

When the collimating member is a concave mirror, the pre-diffraction radiation light may form a predetermined angle between pre-contact and post-contact paths to the collimating member when viewed along the arrangement of the slit unit, the collimating member, and the diffraction grating, and the post-diffraction radiation light may form an acute angle between pre-contact and post-contact paths to the focusing member when viewed along the arrangement of the diffraction grating, the focusing member, and the detection unit.

The diffraction grating may be formed in the shape of a quadrangular plate erected between the pre-diffraction radiation light and the post-diffraction radiation light in the one plane, a plurality of openings being formed in the quadrangular plate, and the detection unit may be located under the diffraction grating and may cover the diffraction grating along the lowermost surface of the diffraction grating when viewed from under the detection unit.

The diffraction grating and the detection unit may overlap each other such that the center of the detection unit coincides with the center of the diffraction grating when viewed from under the detection unit.

The diffraction grating and the detection unit may overlap each other such that the center of the detection unit does not coincide with the center of the diffraction grating when viewed from under the detection unit.

The diffraction grating may be formed in the shape of a polygonal plate erected between the pre-diffraction radiation light and the post-diffraction radiation light in the one plane, a plurality of openings being formed in the polygonal plate, and the detection unit may be located above the diffraction grating and may cover the diffraction grating along the uppermost surface of the diffraction grating when viewed from above the detection unit.

The diffraction grating and the detection unit may overlap each other such that the center of the detection unit coincides with the center of the diffraction grating when viewed from above the detection unit.

The diffraction grating and the detection unit may overlap each other such that the center of the detection unit does not coincide with the center of the diffraction grating when viewed from above the detection unit.

The diffraction grating may be formed in the shape of a polygonal plate between erected the pre-diffraction radiation light and the post-diffraction radiation light in the one plane, a plurality of openings being formed in the polygonal plate, and the detection unit may be located under the diffraction grating and may partially expose the diffraction grating along the lowermost surface of the diffraction grating when viewed from under the detection unit.

The diffraction grating and the detection unit may overlap each other such that the center of the detection unit coincides with the center of the diffraction grating when viewed from under the detection unit.

The diffraction grating and the detection unit may overlap each other such that the center of the detection unit does not coincide with the center of the diffraction grating when viewed from under the detection unit.

The diffraction grating may be formed in the shape of a polygonal plate erected between the pre-diffraction radiation light and the post-diffraction radiation light in the one plane, a plurality of openings being formed in the polygonal plate, and the detection unit may be located above the diffraction grating and may partially expose the diffraction grating along the uppermost surface of the diffraction grating when viewed from above the detection unit.

The diffraction grating and the detection unit may overlap each other such that the center of the detection unit coincides with the center of the diffraction grating when viewed from above the detection unit.

The diffraction grating and the detection unit may overlap each other such that the center of the detection unit does not coincide with the center of the diffraction grating when viewed from above the detection unit.

The diffraction grating may be formed in the shape of a polygonal plate erected between the pre-diffraction radiation light and the post-diffraction radiation light in the one plane, a plurality of openings being formed in the polygonal plate, and the detection unit may be located under the diffraction grating and may expose the diffraction grating along the lowermost surface of the diffraction grating when viewed from under the detection unit.

The diffraction grating and the detection unit may not overlap each other such that the center of the detection unit does not coincide with the center of the diffraction grating when viewed from under the detection unit.

The diffraction grating may be formed in the shape of a polygonal plate erected between the pre-diffraction radiation light and the post-diffraction radiation light in the one plane, a plurality of openings being formed in the polygonal plate, and the detection unit may be located above the diffraction grating and may expose the diffraction grating along the uppermost surface of the diffraction grating when viewed from above the detection unit.

The diffraction grating and the detection unit may not overlap each other such that the center of the detection unit does not coincide with the center of the diffraction grating when viewed from above the detection unit.

When the detection unit includes a photoelectric device located in a predetermined region of the detection unit, a plurality of pixels constituting the photoelectric device, and a photodiode provided at each of the plurality of pixels, each pixel may receive light of a specific wavelength (or specific color) from the post-diffraction radiation light.

The detection unit may be located close to an imaginary optical axis connecting the center of the focusing member and the front of the focusing member to each other, the focusing member may minimize spherical aberration, coma aberration, and astigmatism on the optical axis, and the post-diffraction radiation light may be reflected from the focusing member toward the photoelectric device and thus has a focus on each pixel at the photoelectric device.

Each pixel may receive the post-diffraction radiation light within a range equal to or greater than the maximum opening width of slits of the slit unit in a direction orthogonal to a direction in which the plurality of pixels is arranged.

DETAILED DESCRIPTION OF THE PREFERRED EMBODIMENTS

Hereinafter, preferred embodiments of the present invention will be described in detail with reference to the accompanying drawings such that the present invention can be easily implemented by a person having ordinary skill in the art to which the present invention pertains.

In reflection grating, it is also possible to configure a spectrometer with aberration reduced using dispersion in a vertical direction instead of in-plane dispersion, in the same way as in transmission grating. In addition, a lens mentioned in the invention may be replaced by a mirror according to the equivalence principle of lens and mirror. For example, a convex lens may be replaced by a concave mirror, and a concave lens may be replaced by a convex mirror.

Figure 10:
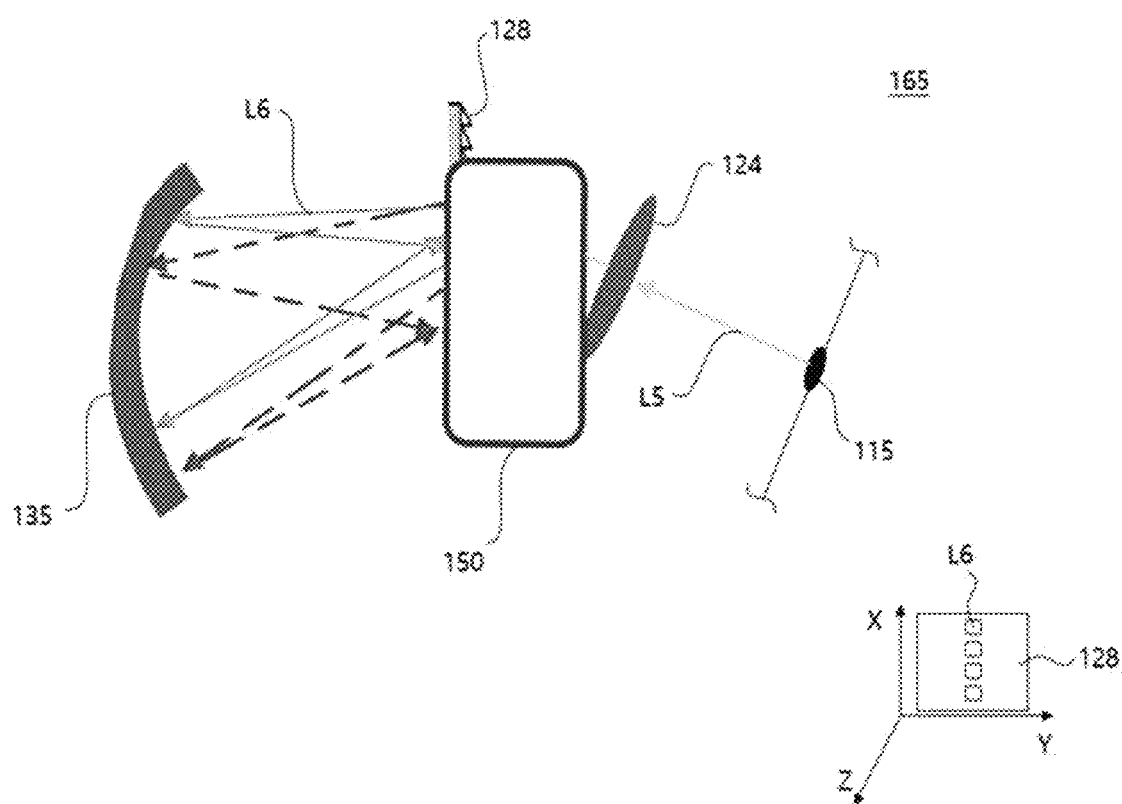
FIG. 10 is a schematic view showing a spectrometer according to the present invention.
Figure 11:
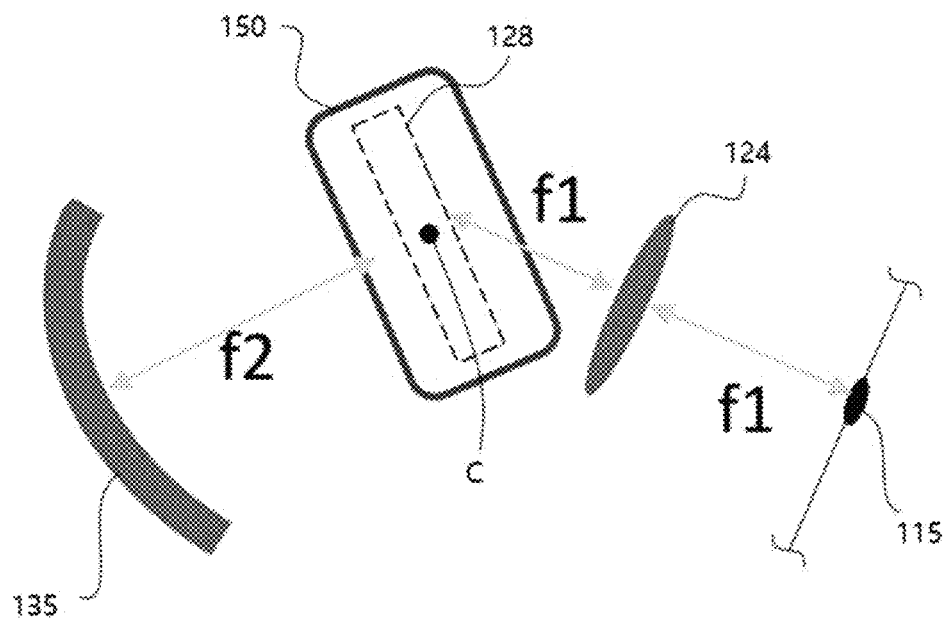
FIG. 11 is a schematic plan view showing the state in which a diffraction grating and a detection unit overlap each other in the spectrometer of FIG. 10.

FIG. 10 is a schematic view showing a spectrometer according to the present invention, and FIG. 11 is a schematic plan view showing the state in which a diffraction grating and a detection unit overlap each other in the spectrometer of FIG. 10.

Figure 12:
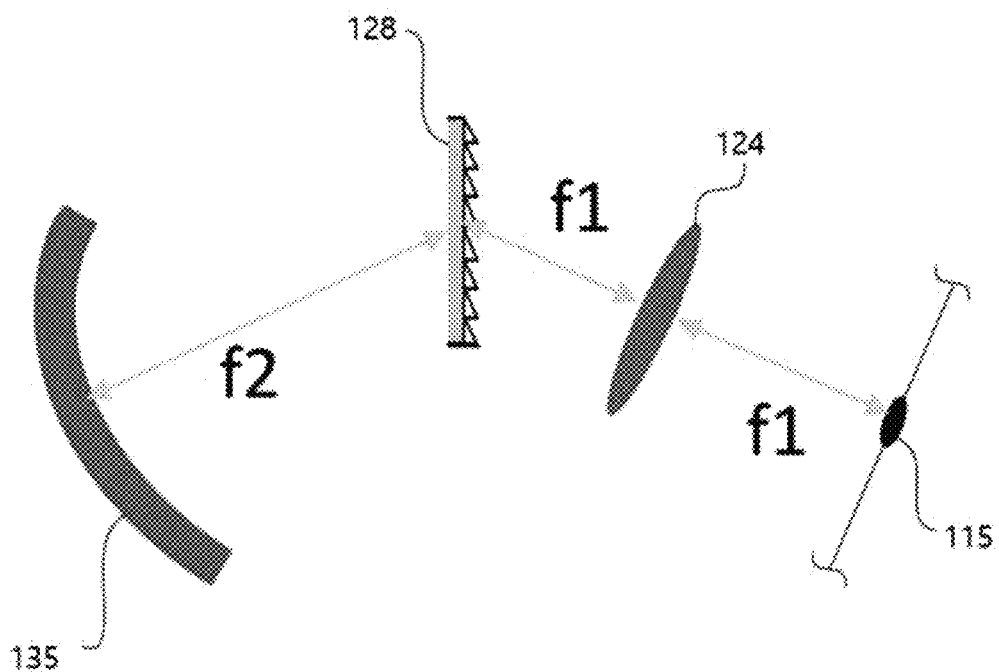
FIG. 12 is a schematic plan view showing other components of the spectrometer of FIG. 10 excluding the detection unit.
Figure 13:
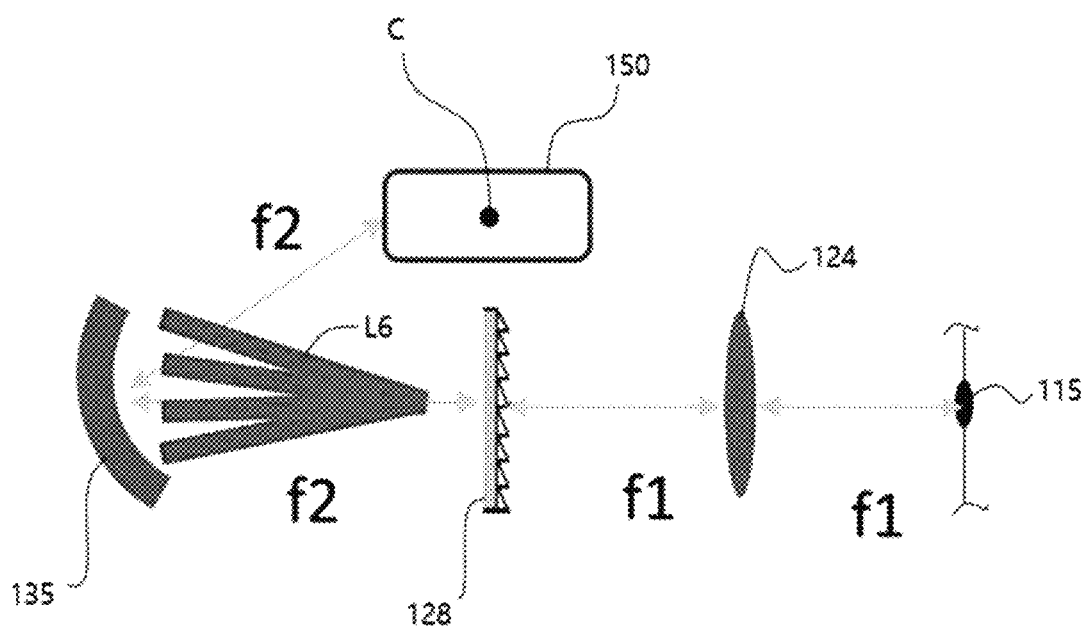
FIG. 13 is a schematic side view showing the spectrometer of FIG. 10.

FIG. 12 is a schematic plan view showing other components of the spectrometer of FIG. 10 excluding the detection unit, and FIG. 13 is a schematic side view showing the spectrometer of FIG. 10.

Figure 1:
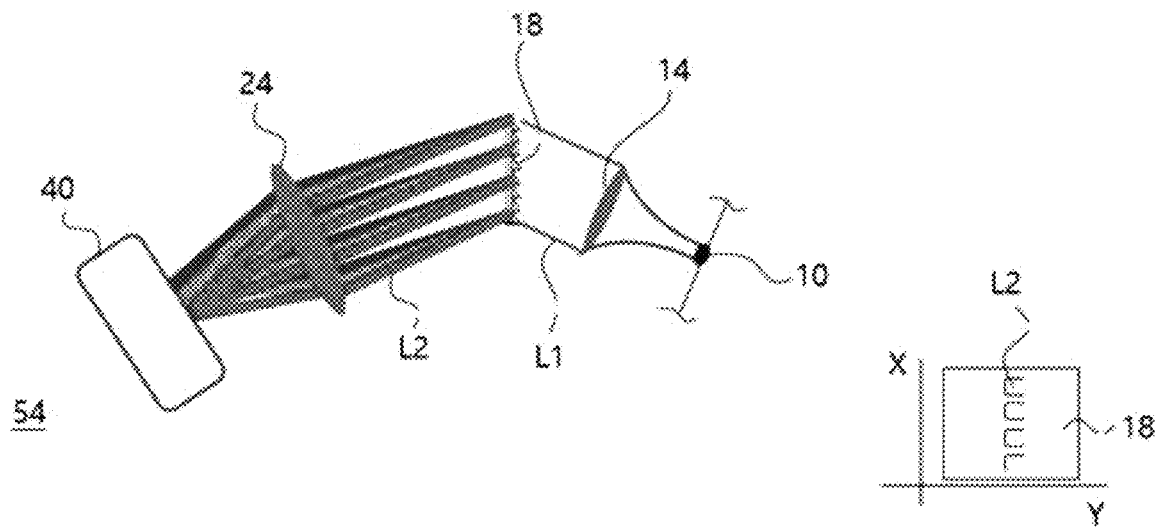
FIG. 1 is a schematic view showing a conventional spectroscopy apparatus.
Figure 2:
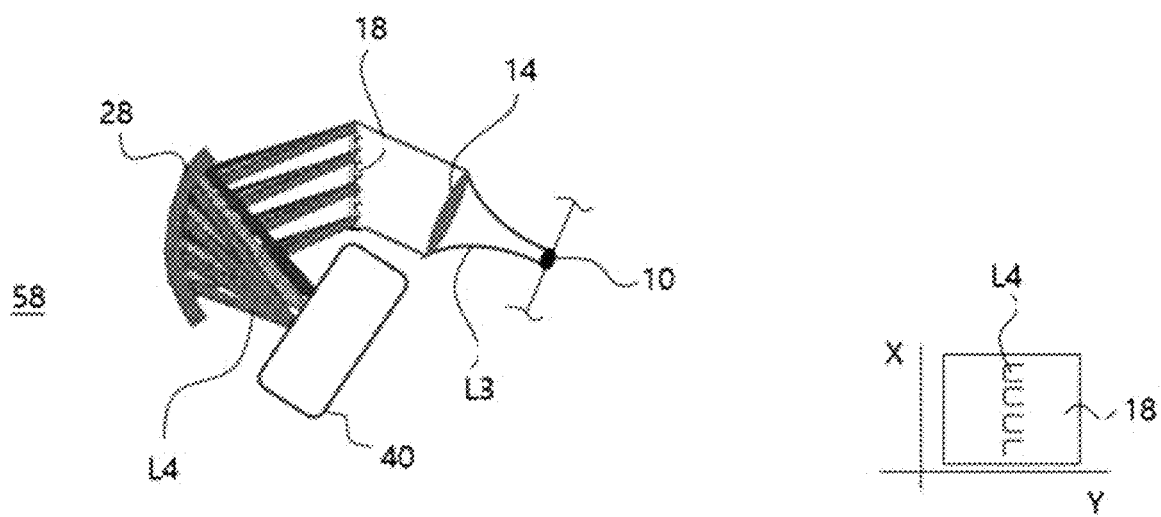
FIG. 2 is a schematic view showing a modification of the spectroscopy apparatus of FIG. 1.
Figure 3:
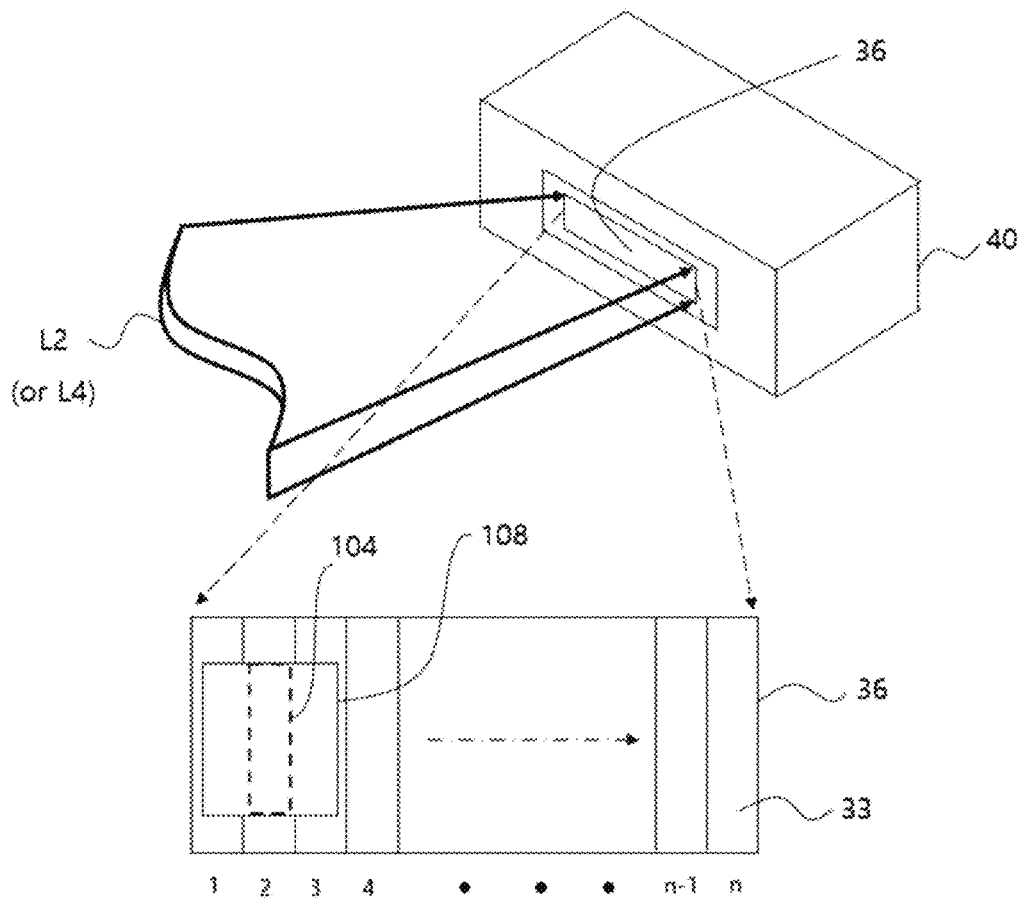
FIG. 3 is a schematic view showing the state in which post-diffraction radiation light is received in a photoelectric device of a detector of FIG. 1 or FIG. 2.
Figure 4:
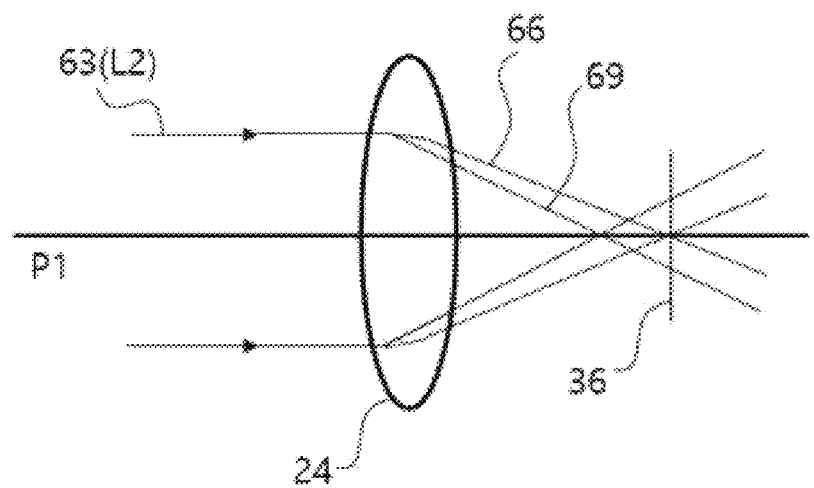
FIG. 4 is a schematic view showing a cause by which chromatic aberration occurs in a light concentration member of the spectroscopy apparatus of FIG. 1.
Figure 5:
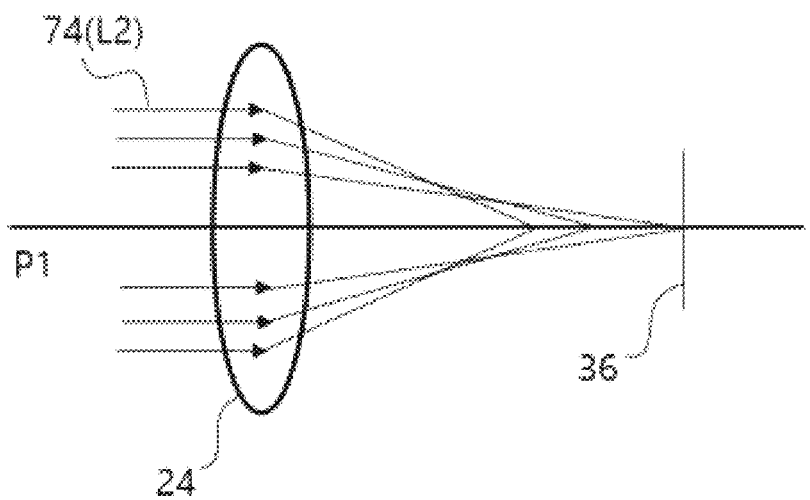
FIG. 5 is a schematic view showing a cause by which spherical aberration occurs in the light concentration member (convex lens) of the spectroscopic apparatus of FIG. 1.
Figure 6:
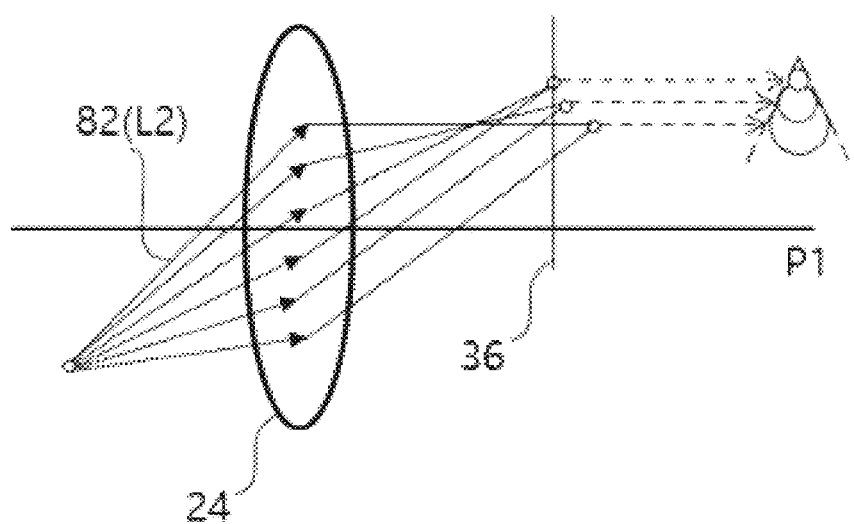
FIG. 6 is a schematic view showing a cause by which coma aberration occurs in the light concentration member (convex lens) of the spectroscopic apparatus of FIG. 1.
Figure 7:
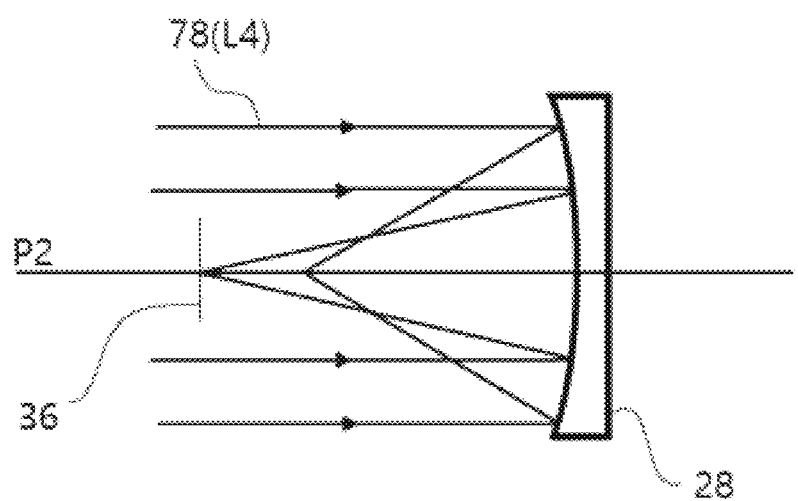
FIG. 7 is a schematic view showing a cause by which spherical aberration occurs in a light concentration member (convex lens) of the spectroscopic apparatus of FIG. 2.
Figure 8:
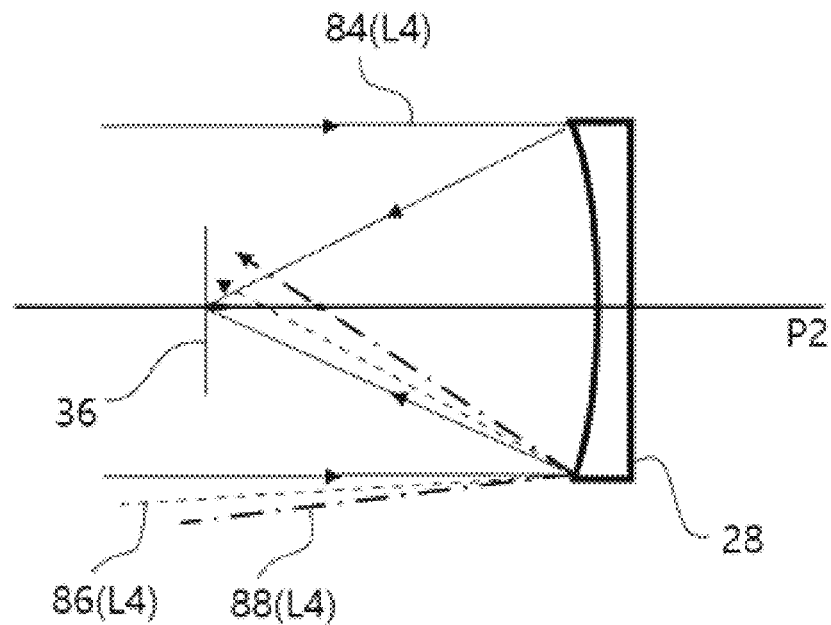
FIG. 8 is a schematic view showing a cause by which coma aberration occurs in the light concentration member (convex lens) of the spectroscopic apparatus of FIG. 2.
Figure 9:
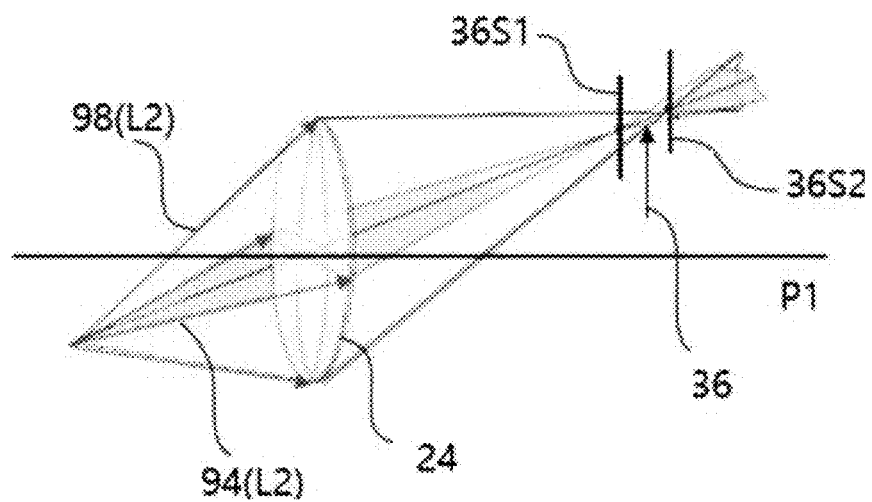
FIG. 9 is a schematic view showing a cause by which astigmatism occurs in the light concentration member (convex lens) of the spectroscopic apparatus of FIG. 1.
Figure 14:
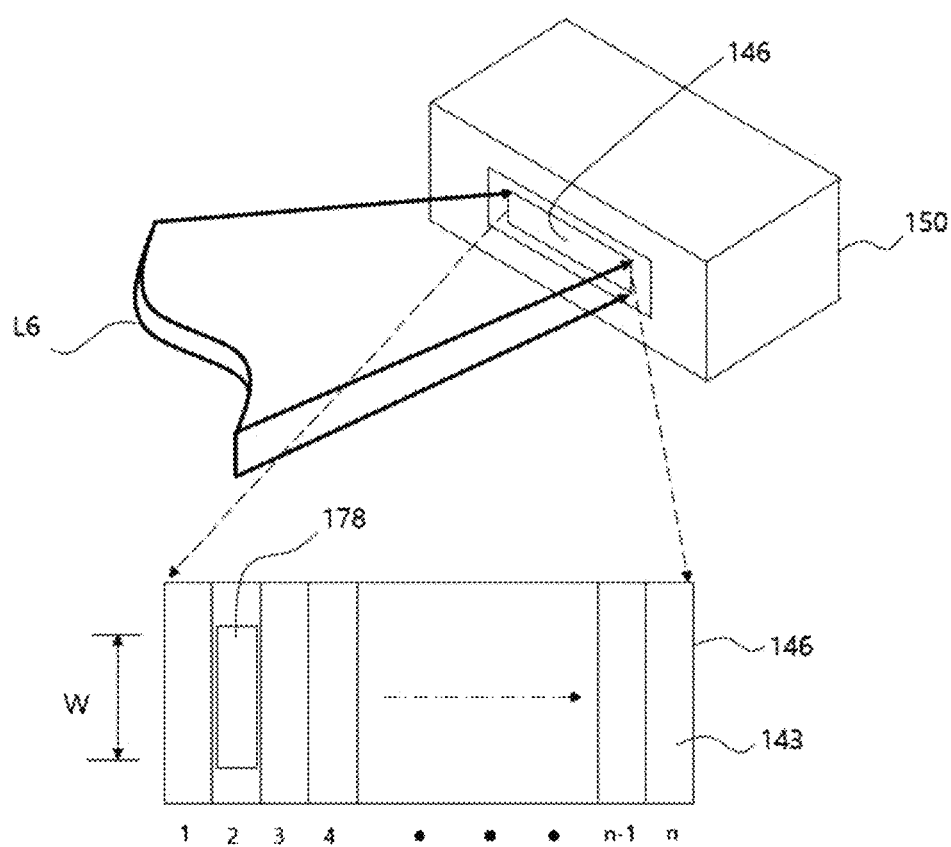
FIG. 14 is a schematic view showing the state in which post-diffraction radiation light is received in a photoelectric device of the detection unit of FIG. 10.

FIG. 14 is a schematic view showing the state in which post-diffraction radiation light is received in a photoelectric device of the detection unit of FIG. 10, and FIGS. 15 to 17 are respectively images of object points showing spherical aberration, coma aberration, and astigmatism of the light concentration member when post-diffraction radiation light is received in the photoelectric device of the detector of FIG. 3.

Figure 15:
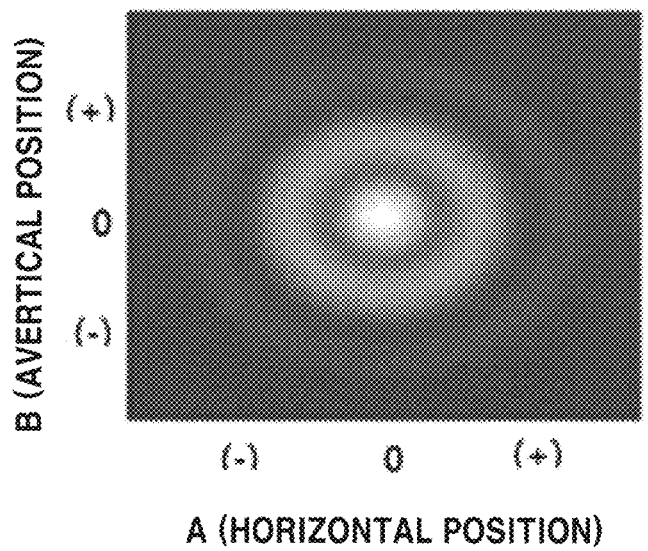
FIGS. 15 to 17 are respectively images of object points showing spherical aberration, coma aberration, and astigmatism of the light concentration member when post-diffraction radiation light is received in the photoelectric device of the detector of FIG. 3.
Figure 16:
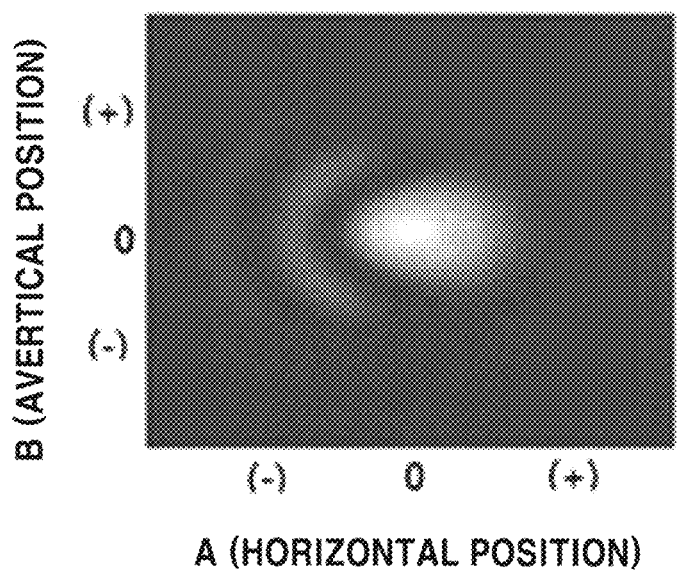
Figure 17:
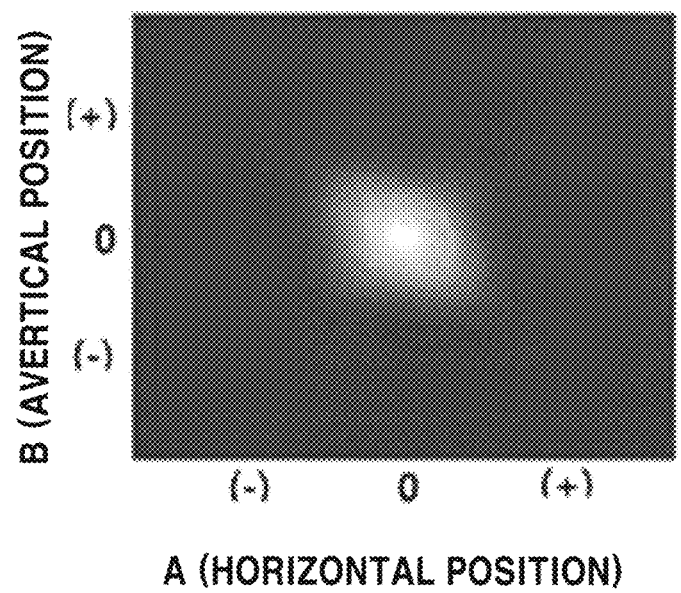
Figure 18:
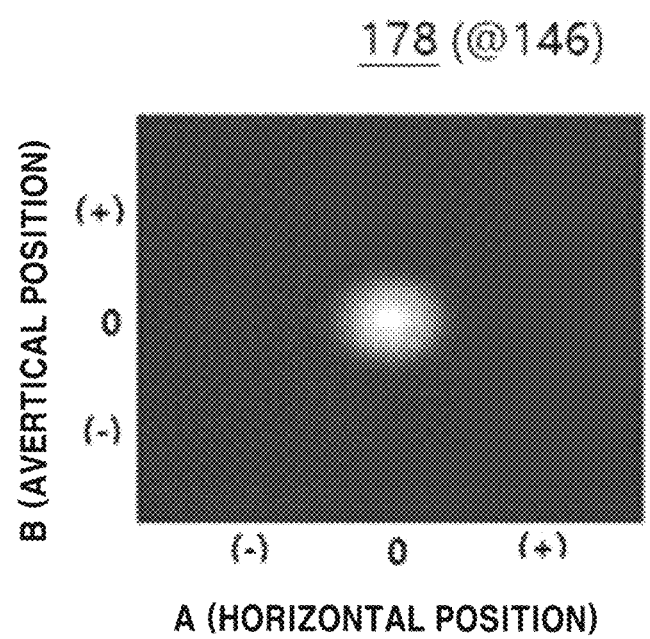
FIG. 18 is an image showing an object point when post-diffraction radiation light is received in the photoelectric device of the detection unit of FIG. 14.
Figure 19:
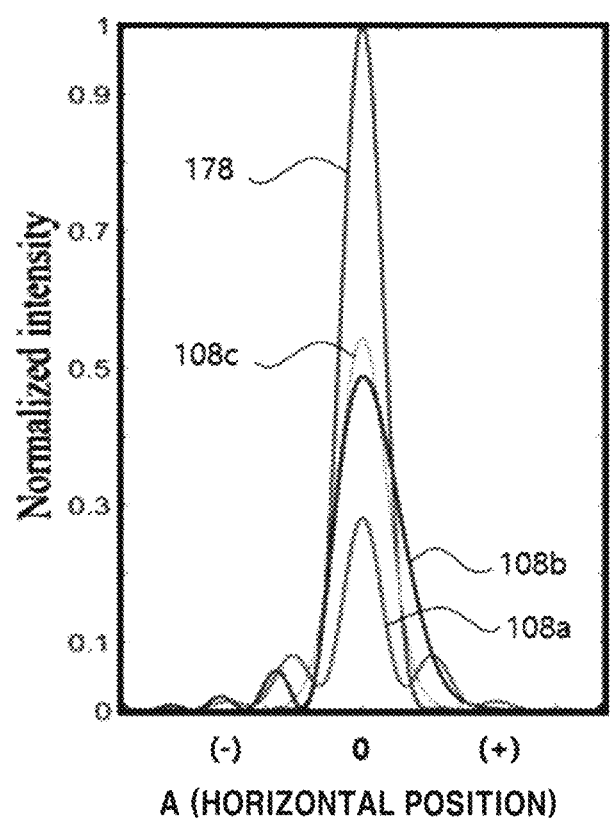
FIG. 19 is a graph showing comparison between energy intensity of an aberration-specific object point when aberrations occur in the light concentration member of FIGS. 15 to 17 and energy intensity of an object point when aberration in a focusing member of FIG. 18 is minimized in a transverse direction of the photoelectric device (see reference symbol A in FIGS. 15 to 18).

FIG. 18 is an image showing an object point when post-diffraction radiation light is received in the photoelectric device of the detection unit of FIG. 14, and FIG. 19 is a graph showing comparison between energy intensity of an aberration-specific object point when aberrations occur in the light concentration member of FIGS. 15 to 17 and energy intensity of an object point when aberration in a focusing member of FIG. 18 is minimized in a transverse direction of the photoelectric device (see reference symbol A in FIGS. 15 to 18).

Referring to FIGS. 10 to 19, the spectrometer 165 according to the present invention is configured as shown in FIG. 10 to generate pre-diffraction radiation light L5 generated from a test sample (not shown) in front of a diffraction grating 128, to allow the pre-diffraction radiation light L5 to be transmitted through the diffraction grating 128, to generate post-diffraction radiation light L6 at the rear of the diffraction grating 128, and to analyze the test sample through the post-diffraction radiation light L6.

Schematically, the spectrometer 165 includes a slit unit 115 and a collimating member 124 sequentially arranged along a path of the pre-diffraction radiation light L5, a focusing member 135 and a detection unit 150 sequentially arranged along a path of the post-diffraction radiation light L6, and a diffraction grating 128 located between the collimating member 124 and the focusing member 135, as shown in FIG. 10.

Here, the slit unit 115, the collimating member 124, the diffraction grating 128, and the focusing member 135 are seated in one plane and are spaced apart from each other by a predetermined distance, as shown in FIG. 10. The detection unit 150 is spaced apart from one plane (e.g. an X-Y plane) and is located above the diffraction grating 128 (e.g. in a Z direction), as shown in FIG. 10. Similarly, the detection unit 150 may be spaced apart from one plane (e.g. the X-Y plane) and may be located under the diffraction grating 128 (e.g. in the Z direction), although not shown in the figures.

More specifically, the slit unit 115 and the diffraction grating 128 are spaced apart from the collimating member 124 by the same focal length, as shown in FIGS. 11 to 13. In FIGS. 10 to 13, the collimating member 124 is a convex lens but also includes a concave mirror not shown in the figures. The diffraction grating 128 and the detection unit 150 are spaced apart from the focusing member 135 by the same focal length, as shown in FIGS. 10 to 13.

In FIGS. 10 to 13, the focusing member 135 includes a concave mirror configured to be open toward the diffraction grating 128 and the detection unit 150. Considering FIGS. 10 to 13, when neighboring two of the slit unit 115, the collimating member 124, and the diffraction grating 128 have a first focal length F1 and neighboring two of the diffraction grating 128, the focusing member 135, and the detection unit 150 have a second focal length F2, the first focal length F1 is equal to the second focal length F2.

On the other hand, considering FIGS. 11 to 13, when neighboring two of the slit unit 115, the collimating member 124, and the diffraction grating 128 have a first focal length F1 and neighboring two of the diffraction grating 128, the focusing member 135, and the detection unit 150 have a second focal length F2, the first focal length F1 is different from the second focal length F2.

In FIGS. 11 to 13, when the collimating member 124 is a convex lens, the pre-diffraction radiation light L5 has a straight path along the arrangement of the slit unit 115, the collimating member 124, and the diffraction grating 128. The post-diffraction radiation light L6 forms an acute angle between pre-contact and post-contact paths to the focusing member 135 when viewed along the arrangement of the diffraction grating 128, the focusing member 135, and the detection unit 150.

When the collimating member 124 is a concave mirror, the pre-diffraction radiation light L5 forms a predetermined angle between pre-contact and post-contact paths to the collimating member 124 when viewed along the arrangement of the slit unit 115, the collimating member 124, and the diffraction grating 128, although not shown in the figures. The post-diffraction radiation light L6 forms an acute angle between pre-contact and post-contact paths to the focusing member 135 when viewed along the arrangement of the diffraction grating 128, the focusing member 135, and the detection unit 150.

In an embodiment of the present invention, considering FIG. 12 or 13, the diffraction grating 128 is formed in the shape of a quadrangular plate erected between the pre-diffraction radiation light L5 and the post-diffraction radiation light L6 in one plane, and a plurality of openings is formed in the quadrangular plate. The detection unit 150 is located under the diffraction grating 128 and covers the diffraction grating 128 along the lowermost surface of the diffraction grating 128 when viewed from under the detection unit 150, although not shown in the figures.

Here, the diffraction grating 128 and the detection unit 150 overlap each other such that the center C of the detection unit coincides 150 with the center of the diffraction grating 128 when viewed from under the detection unit 150. Alternatively, the diffraction grating 128 and the detection unit 150 may overlap each other such that the center of the detection unit 150 does not coincide with the center of the diffraction grating 128 when viewed from under the detection unit 150.

In an embodiment of the present invention, the diffraction grating 128 is formed in the shape of a polygonal plate erected between the pre-diffraction radiation light L5 and the post-diffraction radiation light L6 in one plane, and a plurality of openings is formed in the polygonal plate. In FIGS. 10 to 13, the detection unit 150 is located above the diffraction grating 128 and covers the diffraction grating 128 along the uppermost surface of the diffraction grating 128 when viewed from above the detection unit 150.

Here, in FIGS. 11 and 13, the diffraction grating 128 and the detection unit 150 overlap each other such that the center C of the detection unit 150 coincides with the center of the diffraction grating 128 when viewed from above the detection unit 150. Alternatively, the diffraction grating 128 and the detection unit 150 may overlap each other such that the center of the detection unit 150 does not coincide with the center of the diffraction grating 128 when viewed from above the detection unit 150, although not shown in the figures.

In a first modification of the embodiment of the present invention, the diffraction grating 128 is formed in the shape of a polygonal plate erected between the pre-diffraction radiation light L5 and the post-diffraction radiation light L6 in one plane, and a plurality of openings is formed in the polygonal plate. The detection unit 150 is located under the diffraction grating 128 and partially exposes the diffraction grating 128 along the lowermost surface of the diffraction grating 128 when viewed from under the detection unit 150, although not shown in the figures.

Here, the diffraction grating 128 and the detection unit 150 overlap each other such that the center C of the detection unit 150 coincides with the center of the diffraction grating 128 when viewed from under the detection unit 150. Alternatively, the diffraction grating 128 and the detection unit 150 may overlap each other such that the center of the detection unit 150 does not coincide with the center of the diffraction grating 128 when viewed from under the detection unit 150.

In a first modification of the embodiment of the present invention, the diffraction grating 128 is formed in the shape of a polygonal plate erected between the pre-diffraction radiation light L5 and the post-diffraction radiation light L6 in one plane, and a plurality of openings is formed in the polygonal plate. The detection unit 150 is located above the diffraction grating 128 and partially exposes the diffraction grating 128 along the uppermost surface of the diffraction grating 128 when viewed from above the detection unit 150, although not shown in the figures.

Here, the diffraction grating 128 and the detection unit 150 overlap each other such that the center C of the detection unit 150 coincides with the center of the diffraction grating 128 when viewed from above the detection unit 150. Alternatively, the diffraction grating 128 and the detection unit 150 may overlap each other such that the center of the detection unit 150 does not coincide with the center of the diffraction grating 128 when viewed from above the detection unit 150.

In a second modification of the embodiment of the present invention, the diffraction grating 128 is formed in the shape of a polygonal plate erected between the pre-diffraction radiation light L5 and the post-diffraction radiation light L6 in one plane, and a plurality of openings is formed in the polygonal plate. The detection unit 150 is located under the diffraction grating 128 and exposes the diffraction grating 128 along the lowermost surface of the diffraction grating 128 when viewed from under the detection unit 150, although not shown in the figures.

Here, the diffraction grating 128 and the detection unit 150 do not overlap each other such that the center of the detection unit 150 does not coincide with the center of the diffraction grating 128 when viewed from under the detection unit 150.

In a second modification of the embodiment of the present invention, the diffraction grating 128 is formed in the shape of a polygonal plate erected between the pre-diffraction radiation light L5 and the post-diffraction radiation light L6 in one plane, and a plurality of openings is formed in the polygonal plate. The detection unit 150 is located above the diffraction grating 128 and exposes the diffraction grating 128 along the uppermost surface of the diffraction grating 128 when viewed from above the detection unit 150, although not shown in the figures.

Here, the diffraction grating 128 and the detection unit 150 do not overlap each other such that the center of the detection unit 150 does not coincide with the center of the diffraction grating 128 when viewed from above the detection unit 150.

Meanwhile, considering FIG. 14, when the detection unit 150 includes a photoelectric device 146 located in a predetermined region of the detection unit 150, a plurality of pixels 143 constituting the photoelectric device 146, and a photodiode (not shown) provided at each of the plurality of pixels 143, each pixel 143 receives light of a specific wavelength (or specific color) from the post-diffraction radiation light L6.

Here, considering FIG. 13, the detection unit 150 is located close to an imaginary optical axis connecting the center of the focusing member 135 and the front of the focusing member 135 to each other. As a result, the focusing member 135 minimizes spherical aberration, coma aberration, and astigmatism on the optical axis. The post-diffraction radiation light L6 is reflected from the focusing member 135 toward the photoelectric device 146 and thus has a focus on each pixel 143 at the photoelectric device 146.

In FIG. 14, each pixel 143 receives the post-diffraction radiation light L6 within a range equal to or greater than the maximum opening width W of slits of the slit unit 115 in a direction orthogonal to the direction in which the plurality of pixels 143 is arranged.

Consequently, the post-diffraction radiation light L6 clearly indicates the shape of an object point on the photoelectric device 146 through the focusing member 135. For example, the post-diffraction radiation light L6 generates an image of an object spot as shown in FIG. 18 on the photoelectric device 146 through the focusing member 135.

Consequently, each of the plurality of pixels 143 receives only colored light 178 of a specific wavelength corresponding to the opening area of the slit unit 115. Also, in FIGS. 3, 14, and 19, when the post-diffraction radiation light L4 or L6 is focused on the photoelectric device 36 of the detector 40 or the photoelectric device 146 of the detection unit 150, energy intensity of the post-diffraction radiation light L6 (178) at each pixel 143 is higher than energy intensity of the post-diffraction radiation light L4 (108a, 108b, or 108c) at each pixel 33, when viewed in the transverse direction A of the photoelectric device 36 or 146.

A spectrometer according to the present invention is configured such that:
 a slit unit, a collimating member, a diffraction grating, and a focusing member are sequentially arranged in one plane along an optical path, and a detection unit is located under or above the diffraction grating; and
 when pre-diffraction radiation light is transmitted through the diffraction grating to generate post-diffraction radiation light, and the post-diffraction radiation light is sequentially transmitted from the focusing member to the detection unit during operation of the spectrometer,
 the pre-diffraction radiation light is located between the slit unit, the collimating member, and the diffraction grating, and the post-diffraction radiation light is located between the diffraction grating, the focusing member, and the detection unit, whereby
 it is possible to maximize the intensity of the post-diffraction radiation light received in the photoelectric device of the detection unit while minimizing spherical aberration, coma aberration, and astigmatism of the focusing member applied to the post-diffraction radiation by adjusting the arrangement of the diffraction grating, the focusing member, and the detection unit.

What is claimed is:

1. A spectrometer configured to generate pre-diffraction radiation light generated from a test sample in front of a diffraction grating, to allow the pre-diffraction radiation light to be transmitted or reflected through the diffraction grating, to generate post-diffraction radiation light at a rear of the diffraction grating, and to analyze the test sample through the post-diffraction radiation light, the spectrometer comprising:
 a slit unit and a collimating member sequentially arranged along a path of the pre-diffraction radiation light;
 a focusing member and a detection unit sequentially arranged along a path of the post-diffraction radiation light; and
 the diffraction grating located between the collimating member and the focusing member, wherein
 the slit unit, the collimating member, the diffraction grating, and the focusing member are seated in one plane and are spaced apart from each other by a predetermined distance,
 the diffraction grating is formed in a shape of a polygonal plate erected between the pre-diffraction radiation light and the post-diffraction radiation light in the one plane, and
 the detection unit is spaced apart from the one plane, is located above the diffraction grating, and covers the diffraction grating along an uppermost surface of the diffraction grating when viewed from above the detection unit.

2. A spectrometer configured to generate pre-diffraction radiation light generated from a test sample in front of a diffraction grating, to allow the pre-diffraction radiation light to be transmitted or reflected through the diffraction grating, to generate post-diffraction radiation light at a rear of the diffraction grating, and to analyze the test sample through the post-diffraction radiation light, the spectrometer comprising:
 a slit unit and a collimating member sequentially arranged along a path of the pre-diffraction radiation light;
 a focusing member and a detection unit sequentially arranged along a path of the post-diffraction radiation light; and
 the diffraction grating located between the collimating member and the focusing member, wherein
 the slit unit, the collimating member, the diffraction grating, and the focusing member are seated in one plane and are spaced apart from each other by a predetermined distance, the diffraction grating is formed in a shape of a polygonal plate erected between the pre-diffraction radiation light and the post-diffraction radiation light in the one plane, the detection unit is spaced apart from the one plane, is located above the diffraction grating, and covers the diffraction grating along an uppermost surface of the diffraction grating when viewed from above the detection unit, and wherein the slit unit and the diffraction grating are spaced apart from the collimating member by the same focal length.

3. The spectrometer according to claim 2, wherein the collimating member is a convex lens or comprises a concave mirror.

4. The spectrometer according to claim 1, wherein the diffraction grating and the detection unit are spaced apart from the focusing member by the same focal length.

5. The spectrometer according to claim 4, wherein the focusing member comprises a concave mirror configured to be open toward the diffraction grating and the detection unit.

6. The spectrometer according to claim 1, wherein when neighboring two of the slit unit, the collimating member, and the diffraction grating have a first focal length and neighboring two of the diffraction grating, the focusing member, and the detection unit have a second focal length, the first focal length is equal to the second focal length.

7. The spectrometer according to claim 1, wherein when neighboring two of the slit unit, the collimating member, and the diffraction grating have a first focal length and neighboring two of the diffraction grating, the focusing member, and the detection unit have a second focal length, the first focal length is different from the second focal length.

8. The spectrometer according to claim 1, wherein when the collimating member is a convex lens, the pre-diffraction radiation light has a straight path along an arrangement of the slit unit, the collimating member, and the diffraction grating, and the post-diffraction radiation light forms an acute angle between pre-contact and post-contact paths to the focusing member when viewed along an arrangement of the diffraction grating, the focusing member, and the detection unit.

9. The spectrometer according to claim 1, wherein when the collimating member is a concave mirror, the pre-diffraction radiation light forms a predetermined angle between pre-contact and post-contact paths to the collimating member when viewed along an arrangement of the slit unit, the collimating member, and the diffraction grating, and the post-diffraction radiation light forms an acute angle between pre-contact and post-contact paths to the focusing member when viewed along an arrangement of the diffraction grating, the focusing member, and the detection unit.

10. The spectrometer according to claim 1, wherein the diffraction grating and the detection unit overlap each other such that a center of the detection unit coincides with a center of the diffraction grating when viewed from above the detection unit.

11. The spectrometer according to claim 1, wherein the diffraction grating and the detection unit overlap each other such that a center of the detection unit does not coincide with a center of the diffraction grating when viewed from above the detection unit.

12. A spectrometer configured to generate pre-diffraction radiation light generated from a test sample in front of a diffraction grating, to allow the pre-diffraction radiation light to be transmitted or reflected through the diffraction grating, to generate post-diffraction radiation light at a rear of the diffraction grating, and to analyze the test sample through the post-diffraction radiation light, the spectrometer comprising:

a slit unit and a collimating member sequentially arranged along a path of the pre-diffraction radiation light;

a focusing member and a detection unit sequentially arranged along a path of the post-diffraction radiation light; and the diffraction grating located between the collimating member and the focusing member, wherein the slit unit, the collimating member, the diffraction grating, and the focusing member are seated in one plane and are spaced apart from each other by a predetermined distance, the diffraction grating is formed in a shape of a polygonal plate erected between the pre-diffraction radiation light and the post-diffraction radiation light in the one plane, the detection unit is spaced apart from the one plane, is located above the diffraction grating, and covers the diffraction grating along an uppermost surface of the diffraction grating when viewed from above the detection unit, and wherein when the detection unit comprises:

a photoelectric device located in a predetermined region of the detection unit;

a plurality of pixels constituting the photoelectric device; and a photodiode provided at each of the plurality of pixels, each pixel receives light of a specific wavelength from the post-diffraction radiation light.

13. The spectrometer according to claim 12, wherein the detection unit is located close to an imaginary optical axis connecting a center of the focusing member and a front of the focusing member to each other, the focusing member minimizes spherical aberration, coma aberration, and astigmatism on the optical axis, and the post-diffraction radiation light is reflected from the focusing member toward the photoelectric device and thus has a focus on each pixel at the photoelectric device.

14. The spectrometer according to claim 12, wherein each pixel receives the post-diffraction radiation light within a range equal to or greater than a maximum opening width of slits of the slit unit in a direction orthogonal to a direction in which the plurality of pixels is arranged.

* * * * *